US012322045B2

(12) United States Patent
Weber et al.

(10) Patent No.: US 12,322,045 B2
(45) Date of Patent: Jun. 3, 2025

(54) METHODS AND SYSTEMS FOR CARDIAC CHAMBER IMAGING

(71) Applicant: KONINKLIJKE PHILIPS N.V., Eindhoven (NL)

(72) Inventors: Frank Michael Weber, Norderstedt (DE); Jochen Peters, Norderstedt (DE); Irina Waechter-Stehle, Hamburg (DE); Arne Ewald, Hamburg (DE); Matthias Lenga, Mainz (DE); André Goossen, Eldena (DE); Sebastian Wild, Hamburg (DE); Tobias Wissel, Lübeck (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 350 days.

(21) Appl. No.: 17/799,968

(22) PCT Filed: Feb. 2, 2021

(86) PCT No.: PCT/EP2021/052427
§ 371 (c)(1),
(2) Date: Aug. 16, 2022

(87) PCT Pub. No.: WO2021/165033
PCT Pub. Date: Aug. 26, 2021

(65) Prior Publication Data
US 2023/0061953 A1 Mar. 2, 2023

(30) Foreign Application Priority Data

Feb. 17, 2020 (EP) .................................. 20157641

(51) Int. Cl.
G06T 17/20 (2006.01)
G06T 7/00 (2017.01)
G06T 7/149 (2017.01)

(52) U.S. Cl.
CPC .......... *G06T 17/205* (2013.01); *G06T 7/0012* (2013.01); *G06T 7/149* (2017.01);
(Continued)

(58) Field of Classification Search
CPC ..... G06T 17/205; G06T 7/149; G06T 7/0012; G06T 2207/10136; G06T 2207/30048
See application file for complete search history.

(56) References Cited

U.S. PATENT DOCUMENTS

2016/0220311 A1 8/2016 Mansi et al.
2016/0307331 A1* 10/2016 Mollus .................. G16H 30/40
(Continued)

FOREIGN PATENT DOCUMENTS

EP 1717758 A2 11/2006
EP 2824639 A2 1/2015

OTHER PUBLICATIONS

Ecabert, Olivier, et al. "Segmentation of the heart and great vessels in CT images using a model-based adaptation framework." Medical image analysis 15.6 (2011): 863-876, Jun. 16, 2011.*
(Continued)

*Primary Examiner* — Oneal R Mistry
*Assistant Examiner* — Nhut Huy Pham

(57) ABSTRACT

The invention provides a method for refining a mapped surface mesh of a cardiac chamber. The method includes obtaining a mapped surface mesh of the cardiac chamber anatomy, wherein the mapped surface mesh comprises a central region representing a cardiac chamber and an outer region representing a peripheral cardiac structure connected to the cardiac chamber, and wherein the mapped surface mesh comprises a first view of an anatomical landmark within the cardiac chamber, and obtaining image data of a cardiac chamber anatomy of a subject. The central region of the mapped surface mesh is deformed based on a first (Continued)

segmentation algorithm configured according to one or more predetermined shape-constraints and the outer region of the mapped surface mesh is deformed based on a second segmentation algorithm configured according to the image data, thereby generating a deformed outer region. The deformed central region and the deformed outer region are then combined, thereby generating a refined mapped surface mesh.

12 Claims, 3 Drawing Sheets

(52) U.S. Cl.
CPC ............... *G06T 2207/10136* (2013.01); *G06T 2207/30048* (2013.01)

(56) References Cited

U.S. PATENT DOCUMENTS

2018/0342072 A1    11/2018  Raudins
2019/0362548 A1*   11/2019  Hatanaka ................ G06T 7/149

OTHER PUBLICATIONS

Ecabert, Olivier, et al. "Segmentation of the heart and great vessels in CT images using a model-based adaptation framework." Medical image analysis 15.6 (2011): 863-876. (Year: 2011).*

Chiang, Patricia, et al. "Progressive surface reconstruction for heart mapping procedure." Computer-Aided Design 44.4 (2012): 289-299. (Year: 2012).*

International Search Report and Written Opinion for PCT/EP2021/052427; Mailing date: Mar. 3, 2021, 11 pages.

Ecabert, O. et al., "Segmentation of the heart and great vessels in CT images using a model-based adaptation framework", Medical Image Analysis, 2011, vol. 15, pp. 863-876.

Packer, D.L., et al., "New generation of electro-anatomic mapping: full intracardiac ultrasound image integration", Europace, 2008, vol. 10, No. Suppl 3, pp. iii35-iii41.

Neher, P. et al., "Automatic Segmentation of Cardiac CTs-Personalized Atrial Models Augmented with Electrophysiological Structures", FIMH'11: Proceedings of the 6th international conference on Functional imaging and modeling of the heart, 2011, pp. 80-87.

Hanna, R., et al., "A Hybrid Method for Automatic Anatomical Variant Detection and Segmentation", FIMH'11: Proceedings of the 6th international conference on Functional imaging and modeling of the heart, 2011, pp. 333-340.

Krueger, M.W. et al., "Fusion of Local Activation Time Maps and Image Data to Personalize Anatomical Atrial Models", FIMH 2013, Lecture Notes in Computer Science, vol. 7945, 10 Pages.

Krueger, M.W. et al., "Towards personalized clinical in-silico modeling of atrial anatomy and electrophysiology", Med Biol Eng Comput, 2013, vol. 51, No. 11, pp. 1251-1260.

Maurer, T. et al., "First clinical experience in high-resolution imaging of left atrial anatomy using a novel wide-band dielectric mapping system", Clin Res Cardiol 108, Suppl 1, 2019—Beitrag P891, 1 page.

* cited by examiner

METHODS AND SYSTEMS FOR CARDIAC CHAMBER IMAGING

CROSS-REFERENCE TO PRIOR APPLICATIONS

This application is the U.S. National Phase application under 35 U.S.C. § 371 of International Application No. PCT/EP2021/052427, filed on Feb. 2, 2021, which claims the benefit of European Patent Application No. 20157641.0, filed on Feb. 17, 2020. These applications are hereby incorporated by reference herein.

FIELD OF THE INVENTION

The invention relates to the field of cardiac chamber imaging, and more specifically to the field of 3D cardiac chamber imaging.

BACKGROUND OF THE INVENTION

Electrophysiological mapping systems may be used to guide ablations, for example, in the pulmonary veins (PVs). These systems typically create a real-time estimation of the atrial surface by electrical mapping; however, errors with respect to fluoroscopy may remain leading to an unrefined mapped surface.

The mapped surface typically contains two components: the atrial body; and the pulmonary veins (PVs), which vary strongly in number and branching pattern between patients. As the mapped surface is an approximation only, errors compared to fluoroscopy may remain. For example, the diameter of a PV may be underestimated or overestimated in the mapped surface.

One possible approach for refining the mapped surface using intra-procedural image data could be to use intra-cardiac echo (ICE) data. Typically, intra-cardiac echo data may be used during ablation procedures, for example, to check catheter wall contact or to detect thrombi and tamponade. To leverage ICE data for refining the mapped surface, model-based segmentation (MBS) could be used. This is, however, difficult because a pre-defined model does not sufficiently capture the many different PV configurations. The reason for this is the variation in PV number and branching pattern between patients. A mean MBS model cannot capture this in a sufficient way, because the MBS mesh has a fixed set of vertices and connecting triangles.

One approach would be to identify the most common PV patterns and create different mean models for the most common variants and try to select the best model for a patient. However, a large number of possible variations will still not be covered using this approach.

On the other hand, the mapped surface mesh does cover all anatomical details. However, an arbitrary mesh like the mapped surface mesh cannot simply be provided to an MBS algorithm for adaptation, because many of the parameters of an MBS algorithm are defined specifically for the vertices and triangles of the given model, i.e. the algorithms require a known model topology.

In "Segmentation of the heart and great vessels in CT images using a model-based adaptation framework" by O. Ecabert et al., Medical Image Analysis, Oxford University Press, Oxford, GB, vol. 15, no. 6, pp. 863-876, 7 Jun. 2011 (XP028312871), it is presented a technique for segmenting the heart and the attached great vessels in computed tomography images in a multi-stage process. First, the heart is detected using a Generalized Hough Transformation. Subsequently, the heart chambers are adapted. In the final stage, segments of the large vascular structures are successively activated and adapted.

There is therefore a need for a means of mapping the cardiac chamber anatomy that encompasses the wide variety of possible anatomical variations.

SUMMARY OF THE INVENTION

The invention is defined by the claims.

According to examples in accordance with an aspect of the invention, there is provided a method for refining a mapped surface mesh of a cardiac chamber, for example an atrium, the method comprising:
  obtaining a mapped surface mesh of the cardiac chamber anatomy, wherein the mapped surface mesh comprises a central region representing a cardiac chamber and an outer region representing a peripheral cardiac structure connected to the cardiac chamber, and wherein the mapped surface mesh comprises a first view of an anatomical landmark within the cardiac chamber;
  obtaining image data of a cardiac chamber anatomy of a subject;
  deforming the central region of the mapped surface mesh based on a first segmentation algorithm configured according to one or more predetermined shape-constraints;
  deforming the outer region of the mapped surface mesh based on a second segmentation algorithm configured according to the image data, thereby generating a deformed outer region; and
  combining the deformed central region and the deformed outer region, thereby generating a refined mapped surface mesh,
  wherein deforming the central region of the mapped surface mesh based on the first segmentation algorithm configured according to one or more predetermined shape-constraints comprises:
  deforming (170) a mean mesh model based on the central region of the mapped surface mesh, thereby generating a first deformed mean mesh model;
  deforming (180) the first deformed mean mesh model based on the image data of the cardiac chamber anatomy, thereby generating an adapted mesh model; and
  deforming (190) the central region of the mapped surface mesh based on the deformation applied to the first deformed mean mesh model, thereby generating a deformed central region.

The method provides for a means of accurately adapting a mapped surface mesh to a cardiac chamber anatomy.

For example, if the cardiac chamber is an atrium, the central region of the atrium is similar across multiple subjects, and so can be treated using a generalized model; however, the outer region of the atrium, which comprises the pulmonary vessels, is highly variable between subjects. Thus, by treating the central and outer regions separately, the accuracy of the mapped surface mesh may be improved.

In an embodiment, deforming the central region of the mapped surface mesh based on a first segmentation algorithm comprises aligning a stage of the first segmentation algorithm to the mapped surface mesh based on the first anatomical landmark.

In this way, the accuracy of the deformation may be increased.

In an embodiment, deforming the central region of the mapped surface mesh based on a first segmentation algorithm comprises one or more of:

pushing a point of the mapped surface mesh to an output surface of the first segmentation algorithm; and pulling a point of the mapped surface mesh to an output surface of the first segmentation algorithm.

In an embodiment, deforming the central region of the mapped surface mesh based on the deformation applied to the first deformed mean mesh model comprises:

linking an element of the first deformed mean mesh model to an element of the central region of the mapped surface mesh, thereby forming an element pair;

applying the deformation applied to the first deformed mean mesh model to the element of the central region of the mapped surface mesh.

In this way, the deformations applied to the first deformed mesh model may be applied directly to the mapped surface mesh.

In an embodiment, deforming the outer region of the mapped surface mesh is further based on the deformation applied to the central region of the mapped surface mesh.

In this way, deformation forces within the central region may be accounted for in the outer region.

In an embodiment, the steps of deforming the first deformed mean mesh model and deforming the central region of the mapped surface mesh are performed simultaneously.

In an embodiment, the steps of deforming the central region of the mapped surface mesh and deforming the outer region of the mapped surface mesh are performed simultaneously.

In an embodiment, the method further comprises repeating each of the deformation steps in an iterative manner.

In this way, the mapped surface mesh may be refined multiple times, thereby resulting in a more accurate mapped surface match.

In an embodiment, the method further comprises displaying the refined mapped surface mesh to a user.

In an embodiment, mapped surface mesh obtained by way of electrophysiological mapping.

In an embodiment, wherein an output of the first segmentation algorithm comprises a mesh model, and wherein deforming the mesh model is performed by way of model based segmentation.

In an embodiment, the image data comprises intra-cardiac echo data.

According to examples in accordance with an aspect of the invention, there is provided a computer program comprising computer program code means which is adapted, when said computer program is run on a computer, to implement the methods described above.

According to examples in accordance with an aspect of the invention, there is provided a system for refining a mapped surface mesh of a cardiac chamber comprising a processor, wherein the processor is adapted to:

obtain a mapped surface mesh of the cardiac chamber anatomy, wherein the mapped surface mesh comprises a central region representing a cardiac chamber and an outer region representing a peripheral cardiac structure connected to the cardiac chamber, and wherein the mapped surface mesh comprises a first view of an anatomical landmark within the cardiac chamber;

obtain image data of a cardiac chamber anatomy of a subject;

deform the central region of the mapped surface mesh based on a first segmentation algorithm configured according to one or more predetermined shape-constraints;

deform the outer region of the mapped surface mesh based on a second segmentation algorithm configured according to the image data, thereby generating a deformed outer region; and combine the deformed central region and the deformed outer region, thereby generating a refined mapped surface mesh, wherein, for deforming the central region of the mapped surface mesh based on the first segmentation algorithm configured according to one or more predetermined shape-constraints, the processor is further adapted to:

deform a mean mesh model based on the central region of the mapped surface mesh, thereby generating a first deformed mean mesh model;

deform the first deformed mean mesh model based on the image data of the cardiac chamber anatomy, thereby generating an adapted mesh model; and deform the central region of the mapped surface mesh based on the deformation applied to the first deformed mean mesh model, thereby generating a deformed central region.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
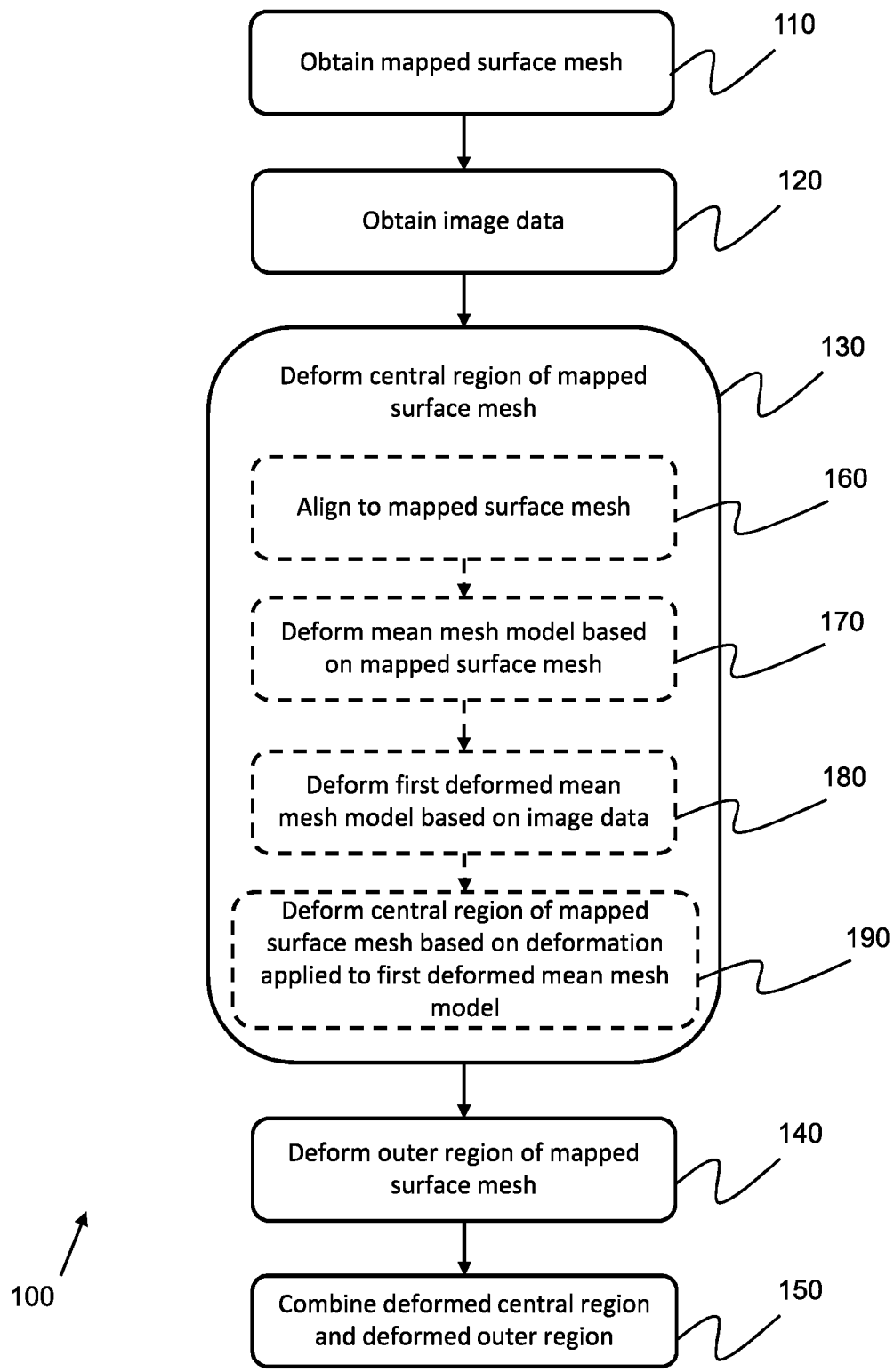
FIG. 1 shows a method of the invention.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a method for refining a mapped surface mesh of a cardiac chamber. The method includes obtaining a mapped surface mesh of the cardiac chamber anatomy, wherein the mapped surface mesh comprises a central region representing a cardiac chamber and an outer region representing a peripheral cardiac structure connected to the cardiac chamber, and wherein the mapped surface mesh comprises a first view of an anatomical landmark within the cardiac chamber, and obtaining image data of a cardiac chamber anatomy of a subject.

The central region of the mapped surface mesh is deformed based on a first segmentation algorithm configured according to one or more predetermined shape-constraints and the outer region of the mapped surface mesh is deformed based on a second segmentation algorithm configured according to the image data, thereby generating a deformed outer region. The deformed central region and the deformed outer region are then combined, thereby generating a refined mapped surface mesh.

In other words, the problem of obtaining a refined mapped surface mesh of a cardiac chamber may be divided into two regions: a central region of the cardiac chamber, which typically has a low anatomical variation, where for example a regular MBS mesh model may operate (the mesh model does not have to include the ancillary cardiac structure, such as vessel entering or leaving the chamber); and an outer region, for example comprising the any ancillary cardiac structures, which typically has a high anatomical variation.

This results in a refined mapped surface mesh that is based on a well-trained and well-understood segmentation of the ICE image in a large central region of the cardiac chamber that is also adapted to the image in the variable outer regions of the chamber anatomy, including, for example the PVs.

For the purposes of illustration, the following description with reference to FIGS. 1 to 4 describes the implementation of the method of the invention when the cardiac chamber is an atrium, and more specifically, a left atrium. However, it should be noted that the methods described herein may be applied to any cardiac chamber, such as: the left atrium; the right atrium; the left ventricle; and the right ventricle.

FIG. 1 shows a method 100 for refining a mapped surface mesh of an atrium.

The method begins in step 110 by obtaining a mapped surface mesh of the atrial anatomy, wherein the mapped surface mesh comprises a central region representing an atrium body and an outer region representing a pulmonary vessel connected to the atrium body, and wherein the mapped surface mesh comprises a first view of an anatomical landmark within the atrium body.

The anatomical landmark may be any anatomical feature within the atrium body.

As discussed above, the mapped surface mesh may be obtained by way of electrophysiological mapping. Electrophysiological mapping may be performed, for example, by way of a catheter introduced through a vein or artery of a subject in order to measure electrical activity from within the heart.

In step 120, image data of an atrial anatomy of a subject is obtained. The image data may comprise intra-cardiac echo data, or any other suitable image data type, such as transesophageal echo (TEE), trans-thoracic echo (TTE) or 3D x-ray angiography.

In step 130, the central region of the mapped surface mesh is deformed based on a first segmentation algorithm configured according to one or more predetermined shape-constraints.

The first segmentation algorithm may be any suitable segmentation algorithm that has been trained on the well-known shape of the central region of a cardiac chamber. For example, the first segmentation algorithm may be a deep-learning based segmentation algorithm that includes one or more shape constraints according to the area of interest, i.e. the central region of the cardiac chamber.

A detailed example of an implementation of the first segmentation algorithm based on model based segmentation (MBS) is provided below.

The deformation of the central region of the mapped surface mesh may include one or more of: pushing a point of the mapped surface mesh to an output surface of the first segmentation algorithm; and pulling a point of the mapped surface mesh to an output surface of the first segmentation algorithm.

In an example, the first segmentation algorithm may comprise a voxel classifier that would mark all image voxels belonging to the Left Atrium (LA) body. The output surface of the first segmentation algorithm would be the boundary between marked and unmarked voxels in the image. Alternatively, the output of the first segmentation algorithm may be a probability map, wherein each voxel is assigned a probability that it belongs to the LA body. In this case, the surface may be an isosurface in the probability map, for example, comprising voxels having a certain value, or range, of probabilities, such as between 0.45 and 0.55.

In step 160, a stage of the first segmentation algorithm may be aligned to the mapped surface mesh based on the first anatomical landmark. The stage of the first segmentation algorithm may be any stage of the segmentation algorithm, such as an initial segmentation mesh, an intermediate segmentation result or the final segmentation output.

For example, the mean mesh model of the cardiac chamber comprised in the first segmentation algorithm may also comprise a view of the anatomical landmark. In this case, the mean mesh model and the mapped surface mesh may be aligned, wherein the alignment is based solely on the two meshes, for example based on an anatomical landmark present in both meshes.

The deforming of the central region of the mapped surface mesh based on a MBS algorithm will now be described.

In step 170, the mean mesh model is deformed based on the central region of the mapped surface mesh, thereby generating a first deformed mean mesh model. The deformation of the mean mesh model may be performed by way of model based segmentation.

Put another way, the mean mesh model is deformed such that it matches the central region of the mapped surface model. For example, based on the selected degrees-of-freedom of the models, the distance of the mean mesh model to the mapped surface may be minimized in the central region common to both meshes. The deformation may be achieved using a point-to-plane iterative closest point (ICP) method, for example by registering the mean mesh model points to close-by points on the surface of the mapped surface mesh).

Alternatively, the deformation may be achieved by searching for target points on the mapped surface mesh by casting rays from the triangles of the mean mesh model and using an intersection with the mapped surface mesh to serve as a target point for deforming the mesh model. The mesh model may then be deformed while considering other model properties, such as shape constraints and internal energy.

Further, correspondence between the surfaces of the mapped surface mesh and the mesh model may be established in the overlapping central region such that, for each element in the mapped surface mesh, a corresponding element in the mean mesh model is found (for example, with the distance between the corresponding elements being limited to be below a given threshold).

In step 180, the first deformed mean mesh model is deformed based on the image data of the atrial anatomy, thereby generating an adapted mesh model. Deforming the first deformed mean mesh model may comprise registering the first deformed mean mesh model to the image data of the atrial anatomy, for example by way of a generalized Hough transform, deep learning based landmark detection or any other suitable method of registering the first deformed mesh model to the image data.

By way of clarification, until step 180, no image data relating to the atrial anatomy has been used in the deformation of the central region of the mapped surface mesh.

In step 190, the central region of the mapped surface mesh is deformed based on the deformation applied to the first deformed mean mesh model, thereby generating a deformed central region.

Deforming the central region of the mapped surface mesh based on the deformation applied to the first deformed mean mesh model may include linking an element of the first deformed mesh model to an element of the central region of the mapped surface mesh, thereby forming an element pair, and applying the deformation applied to the first deformed mesh model to the element pair.

In other words, the deformations in which the regions of the mesh model and the mapped surface mesh have a correspondence may be linked to one another. In this way, the MBS boundary detectors may create forces that actively deform the mean mesh model and the central region of the mapped surface mesh together. Further, the steps of deforming the first deformed mesh model and deforming the central region of the mapped surface mesh may be performed simultaneously.

In step 140, the outer region of the mapped surface mesh is deformed based on a second segmentation algorithm configured according to the image data, thereby generating a deformed outer region. In other words, the outer region may be actively deformed based on only the image data acquired from the individual subject.

The deformation of the outer region of the mapped surface mesh may be further based on the deformation applied to the central region of the mapped surface mesh. In other words, the outer region of the mapped surface mesh, which may include structures such as the PVs, may be moved passively by the deformation forces applied to the central region. Further, the steps of deforming the central region of the mapped surface mesh and deforming the outer region of the mapped surface mesh is performed simultaneously. In particular, the passive deformation forces may be applied to the outer region at the same time the active deformation forces are applied to the central region.

Using the ICE image data, the outer region of the mapped surface mesh is deformed. This may be done after the deformation of the central body or directly at the same time.

The boundary detectors for the PVs in the outer region may be determined on a case by case basis for the current mapped surface mesh topology. The boundary detectors may be determined in a number of ways.

For example, boundary conditions may be transferred from a portion of the central region in close proximity to the portion of the outer region in question, such as the region around the PV ostium. In another example, the boundary detection may be performed using a pre-calculated boundary detector for each specific pulmonary vein (for example, assuming that all branches of the left upper PV (LUPV) and the central LUPV are all assigned a boundary detector pre-calculated for the LUPV, wherein branches with an unknown label may be assigned an average fall-back boundary detector.

Alternatively, a region of interest is determined in which to apply a deep learning based algorithm to detect a structure of interest. For example, to feed back this information into the mapped surface mesh, the segmentation mask may be converted into a grey value image and the mesh model may be adapted using grey value features. Further, the boundary detectors for the mapped surface mesh may also be refined multiple time after the first iteration of deformations.

When deforming the outer region within a MBS framework, no statistical mean shape is available for that region, due to the high variability in anatomy and the number of mesh triangles. Therefore, during deformation of the outer region, the mapped surface mesh may be used as a mean shape model for the outer region to penalize unreasonable deformations from the originally mapped shape. Further adaptation parameters, such as allowed affine transformations, may be defined in a similar fashion to the boundary detectors, for example from the closest region of the mean mesh model, or a pre-defined shape for an anatomical region, if needed.

In step 150, the deformed central region and the deformed outer region are combined, thereby generating a refined mapped surface mesh.

The deformation steps described above may be repeated in an iterative manner in order to further refine the mapped surface mesh.

After the deformation process is complete, output of the first segmentation algorithm, such as the MBS mesh model, may be discarded. The result is a refined mapped surface mesh that is based on a well-trained and well-understood segmentation of an ICE image in a large central region, but is also adapted to the image in the variable outer region. Furthermore, the refined mapped surface mesh matches the ICE image and can be shown as an overlay on the image data in a manner that is clear to the operator.

In other words, the refined mapped surface mesh may be displayed to a user, either as an overlay to the image data or as a standalone surface mesh.

Figure 2:
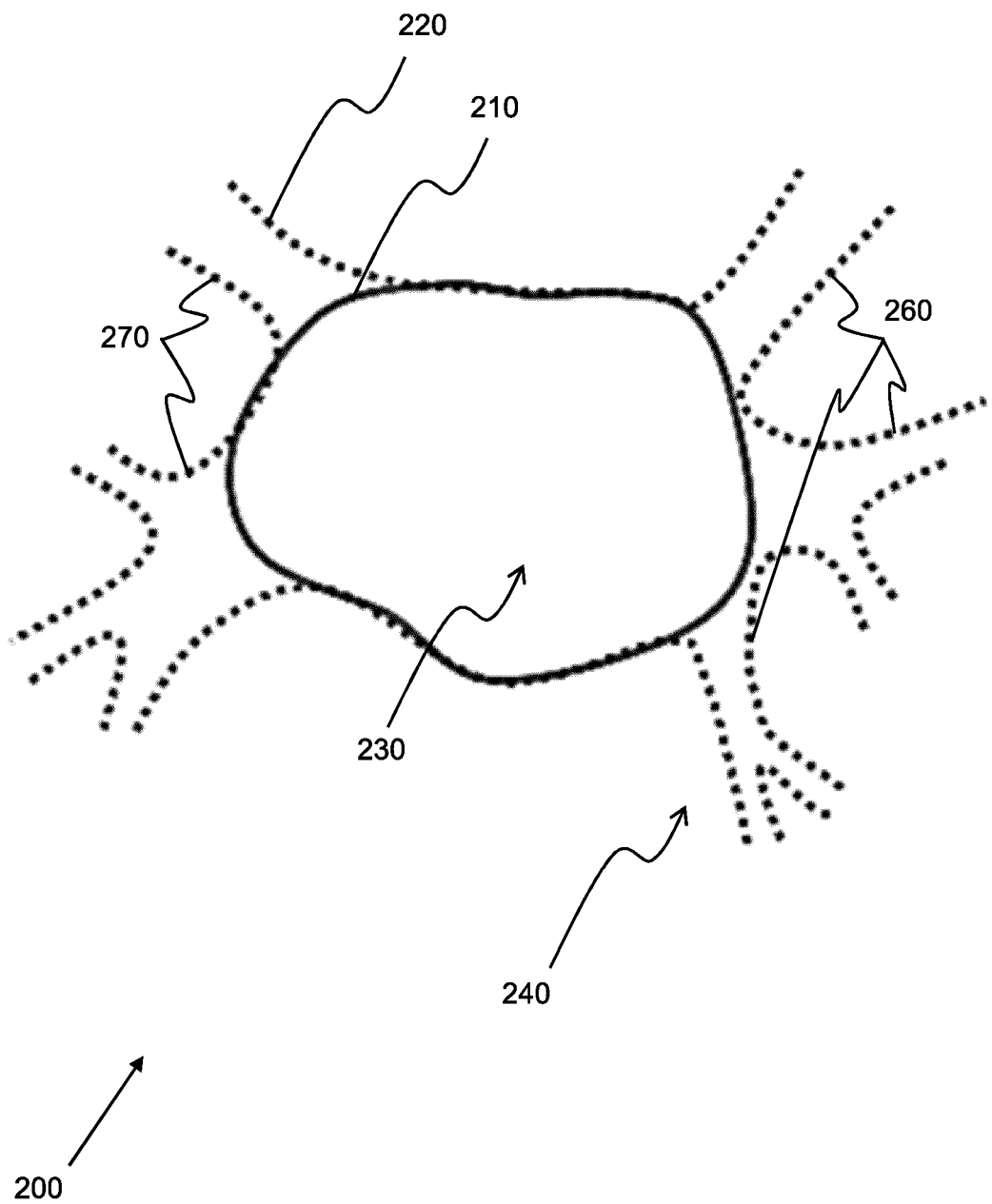
FIG. 2 shows an example of a mesh model overlaid on a mapped surface mesh.

FIG. 2 shows an example 200 of a mean mesh model 210, shown as a solid line, overlaid on a mapped surface mesh 220, shown as a dotted line, for a left atrium.

As described above, the mean mesh model 210 governs the deformation of the central region 230 (atrial body), whereas the deformation of the outer region 240, which includes left PVs 250 and right PVs 260 in the example shown in FIG. 1, is based on the mapped surface mesh 220.

Figure 3:
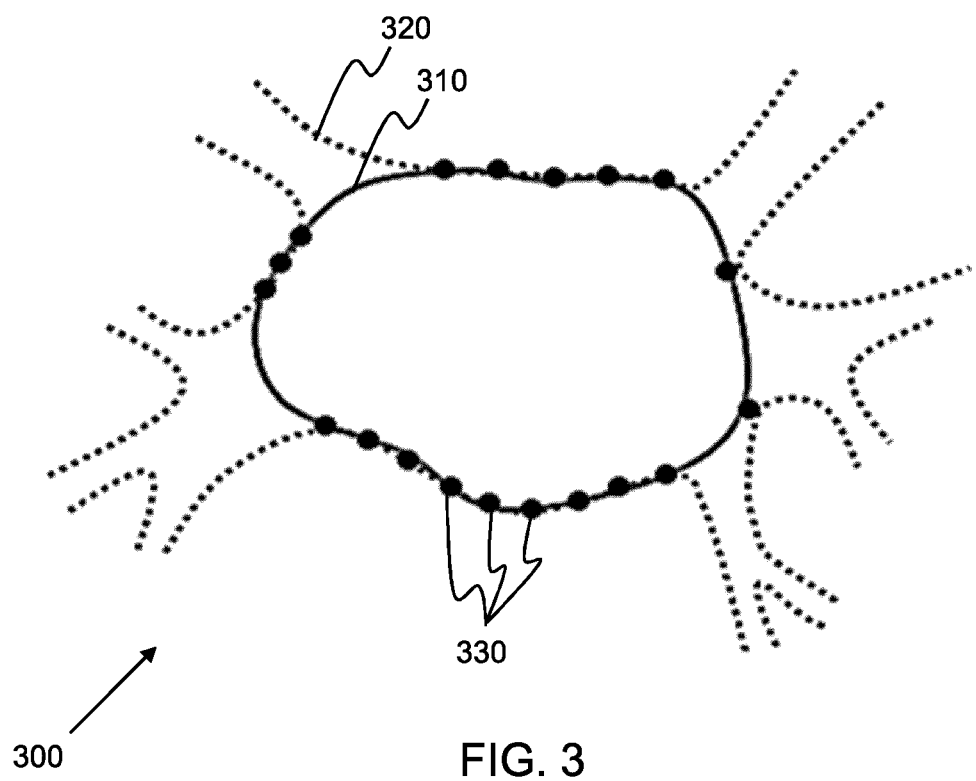
FIG. 3 shows an example of the first deformed mesh model overlaid on the mapped surface mesh.

FIG. 3 shows an example 300 of the first deformed mesh model 310 overlaid on the mapped surface mesh 320. After the mean mesh model 310 has been deformed to match the mapped surface mesh, corresponding/close-by elements 330 may be identified and linked together, such that they move together when a further deformation is applied.

Figure 4:
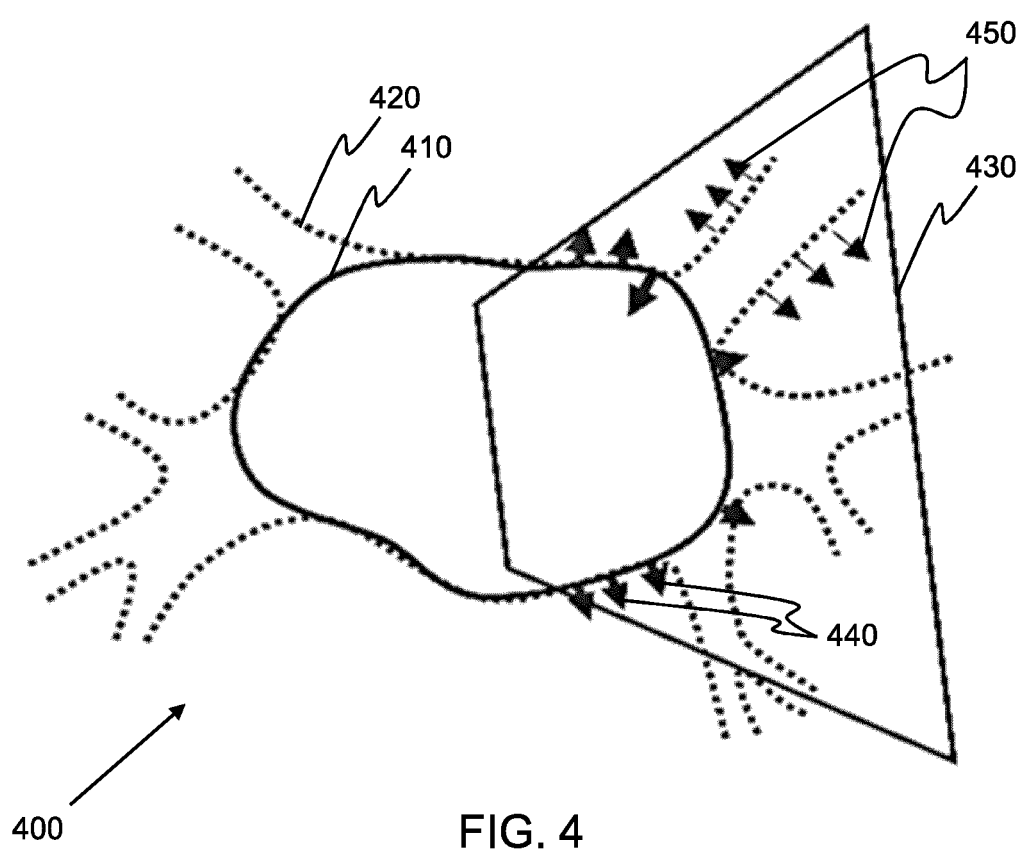
FIG. 4 shows an example of the mesh model and the mapped surface mesh undergoing deformation.

FIG. 4 shows an example 400 of the mesh model 410 and the mapped surface mesh 420 undergoing deformation based on ICE image data captured from the field of view 430 of an ICE catheter.

Within the field of view 430, the segmentation algorithm may search for image boundaries 440 on the mean mesh model. For the mapped surface mesh 420, auxiliary boundary detectors may be created after mesh registration, which detect further image boundaries 450 in the highly variable region of the PVs that the first segmentation algorithm cannot properly describe. These forces can be used in consecutive steps, to first deform MBS mesh model only and move linked mapped surface mesh elements passively, or in parallel to combine both forces to update the mapped surface mesh.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

A single processor or other unit may fulfill the functions of several items recited in the claims.

The mere fact that certain measures are recited in mutually different dependent claims does not indicate that a combination of these measures cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems.

If the term "adapted to" is used in the claims or description, it is noted the term "adapted to" is intended to be equivalent to the term "configured to".

Any reference signs in the claims should not be construed as limiting the scope.

What is claimed is:

1. A method for refining a mapped surface mesh of a cardiac chamber, the method comprising:
    obtaining a mapped surface mesh of the cardiac chamber anatomy, wherein the mapped surface mesh comprises a central region representing a cardiac chamber and an outer region representing a peripheral cardiac structure connected to the cardiac chamber, and wherein the mapped surface mesh comprises a first view of an anatomical landmark within the cardiac chamber, and wherein the mapped surface mesh is obtained by way of electrophysiological mapping;
    obtaining image data of a cardiac chamber anatomy of a subject, wherein the image data comprises data selected from intra-cardiac echo data, trans-esophageal echo data, trans-thoracic echo data or three-dimensional (3D) x-ray angiography data;
    deforming the central region of the mapped surface mesh based on a first segmentation algorithm configured according to one or more predetermined shape-constraints;
    deforming the outer region of the mapped surface mesh based on a second segmentation algorithm configured according to the image data, thereby generating a deformed outer region; and
    combining the deformed central region and the deformed outer region, thereby generating a refined mapped surface mesh,
    wherein deforming the central region of the mapped surface mesh based on the first segmentation algorithm configured according to one or more predetermined shape-constraints comprises:
    deforming a mean mesh model based on the central region of the mapped surface mesh, thereby generating a first deformed mean mesh model;
    deforming the first deformed mean mesh model based on the image data of the cardiac chamber anatomy, thereby generating an adapted mesh model; and
    deforming the central region of the mapped surface mesh based on the deformation applied to the first deformed mean mesh model, thereby generating a deformed central region.

2. The method as claimed in claim 1, wherein deforming the central region of the mapped surface mesh based on a first segmentation algorithm comprises aligning a stage of the first segmentation algorithm to the mapped surface mesh based on the first anatomical landmark.

3. The method as claimed in claim 1, wherein deforming the central region of the mapped surface mesh based on a first segmentation algorithm comprises one or more of:
    pushing a point of the mapped surface mesh to an output surface of the first segmentation algorithm; and
    pulling a point of the mapped surface mesh to an output surface of the first segmentation algorithm.

4. The method as claimed in claim 1, wherein deforming the central region of the mapped surface mesh based on the deformation applied to the first deformed mean mesh model comprises:
    linking an element of the first deformed mean mesh model to an element of the central region of the mapped surface mesh, thereby forming an element pair;
    applying the deformation applied to the first deformed mean mesh model to the element of the central region of the mapped surface mesh.

5. The method as claimed in claim 1, wherein deforming the outer region of the mapped surface mesh is further based on the deformation applied to the central region of the mapped surface mesh.

6. The method as claimed in claim 1, wherein the steps of deforming the first deformed mean mesh model and deforming the central region of the mapped surface mesh are performed simultaneously.

7. The method as claimed in claim 1, wherein the steps of deforming the central region of the mapped surface mesh and deforming the outer region of the mapped surface mesh are performed simultaneously.

8. The method as claimed in claim 1, wherein the method further comprises repeating each of the deformation steps in an iterative manner.

9. The method as claimed in claim 1, wherein the method further comprises displaying the refined mapped surface mesh to a user.

10. The method as claimed in claim 1, wherein an output of the first segmentation algorithm comprises a mesh model, and wherein deforming the mesh model is performed by way of model based segmentation.

11. A non-transitory computer readable medium comprising computer program code means which is adapted, when said computer program code means is run on a computer, to implement the method of claim 1.

12. A system for refining a mapped surface mesh of a cardiac chamber comprising a processor, wherein the processor is adapted to:
    obtain a mapped surface mesh of the cardiac chamber anatomy, wherein the mapped surface mesh comprises a central region representing a cardiac chamber and an outer region representing a peripheral cardiac structure connected to the cardiac chamber, and wherein the mapped surface mesh comprises a first view of an anatomical landmark within the cardiac chamber, and wherein the mapped surface mesh is obtained by way of electrophysiological mapping;
    obtain image data of a cardiac chamber anatomy of a subject, wherein the image data comprises data selected from intra-cardiac echo data, trans-esophageal echo data, trans-thoracic echo data or three-dimensional (3D) x-ray angiography data;
    deform the central region of the mapped surface mesh based on a first segmentation algorithm configured according to one or more predetermined shape-constraints;

deform the outer region of the mapped surface mesh based on a second segmentation algorithm configured according to the image data, thereby generating a deformed outer region; and combine the deformed central region and the deformed outer region, thereby generating a refined mapped surface mesh, wherein, for deforming the central region of the mapped surface mesh based on the first segmentation algorithm configured according to one or more predetermined shape-constraints, the processor is further adapted to:

deform a mean mesh model based on the central region of the mapped surface mesh, thereby generating a first deformed mean mesh model;

deform the first deformed mean mesh model based on the image data of the cardiac chamber anatomy, thereby generating an adapted mesh model; and deform the central region of the mapped surface mesh based on the deformation applied to the first deformed mean mesh model, thereby generating a deformed central region.

\* \* \* \* \*